United States Patent [19]

Metz et al.

[11] Patent Number: 5,586,355
[45] Date of Patent: Dec. 24, 1996

[54] SAFETY DEVICE FOR A VERTICALLY STORED DOCK LEVELER

[75] Inventors: Donald Metz, Kirkville, N.Y.; James C. Alexander, London, Canada

[73] Assignee: United Dominion Industries, Inc., Charlotte, N.C.

[21] Appl. No.: 408,038

[22] Filed: Mar. 21, 1995

[51] Int. Cl.$^6$ ................................................. E01D 15/127
[52] U.S. Cl. ............................. 14/69.5; 14/71.1; 14/71.3
[58] Field of Search ................................... 14/69.5, 71.1, 14/71.3, 71.5, 71.7; 414/392, 398, 401

[56] References Cited

U.S. PATENT DOCUMENTS 5,440,772  8/1995  Springer et al. ........................ 14/69.5

*Primary Examiner*—Henry A. Bennett
*Assistant Examiner*—Pamela A. O'Connor
*Attorney, Agent, or Firm*—Sughrue, Mion, Zinn, Macpeak & Seas

[57] ABSTRACT

A vertically storing dock leveler comprises a deck, a pivot coupling the leveler to the mounting pit to allow the deck the rotate from a stored vertical position to an operative horizontal position and a source of power to rotate the deck. A sensor is mounted to the underside of the deck for delivering an output that ceases downward movement of said deck when a foreign object such as a human is sensed under said deck. The sensor comprises a wire mounted to span said deck at a position below it and a switch responsive to movement of said wire. The switch may be a mechanical, proximity or photoelectric type. The wire is fixed at one side of said deck and coupled to a pivoting member at the other side with the pivoting member normally positioned in proximity to said switch. A spring is employed to bias the pivoting member to a centered position relative to the switch in opposition to tension of the wire.

11 Claims, 3 Drawing Sheets

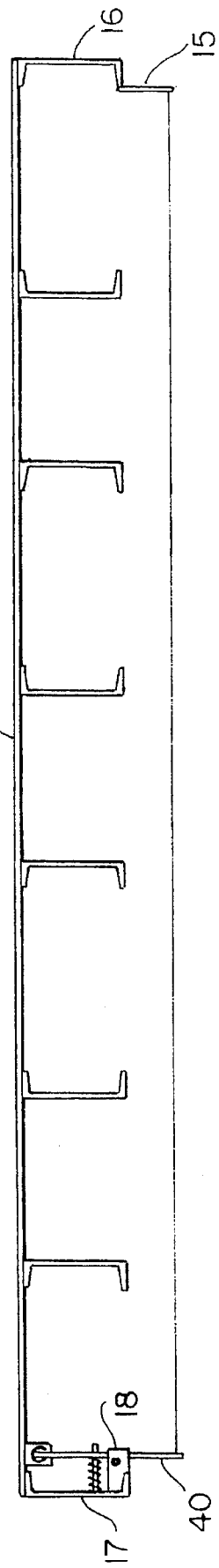
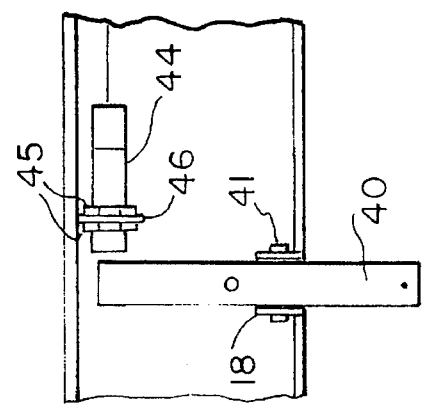
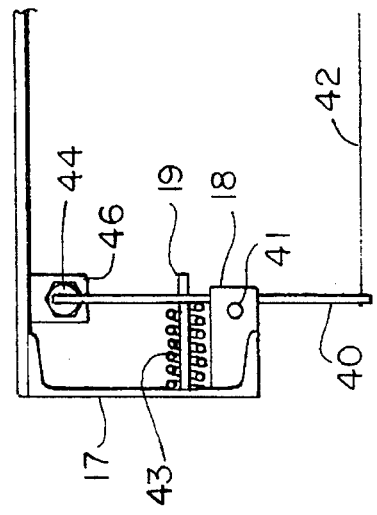

SAFETY DEVICE FOR A VERTICALLY STORED DOCK LEVELER

BACKGROUND OF THE INVENTION

Hydraulically operated vertically storing dock levelers typically are mounted on hinges several feet behind the doorway of a loading dock. They are stored vertically to allow the loading dock door to seal directly to the pit floor. This provides better security for the loading dock, cleanliness and energy conservation when compared with conventional pit levelers. The control systems used to actuate these hydraulic devices usually have safeguards to protect workers from injury due to the potential energy stored in the raised leveler. However, there still may be an opportunity for someone to lower the leveler while another person is standing between the raised leveler and the door, because the raised leveler may block the view of the operator. In some installations, a special switch or "Emergency Stop Button" has been mounted on the under side of the leveler to allow someone to stop the lowering of the leveler. A limitation of the "Emergency Stop Button" is that the person may panic and miss the button. Also, a person needs to understand that the button is even present to stop operations.

SUMMARY OF THE INVENTION

Given the deficiencies in the prior art it is an object of this invention to provide an improved safety device for a vertically storing leveler.

It is a further object of this invention to provide a device that passively senses the presence of an individual under the leveler and stop the downward movement immediately.

It is another object of this invention to provide a reliable and simple passive emergency stop device for a vertically storing dock leveler.

This invention is an improved safety device to protect a person from injury through accidental lowering of the dock leveler. The device provides protection for almost the entire width of the dock leveler. As a result it provides passive protection. Even if the person is standing with his back to the dock leveler as when opening the door, the dock leveler will stop lowering if the safety device contacts an obstruction.

In accordance with a preferred embodiment of this invention a vertically storing dock leveler comprises a deck, a pivot coupling the leveler to the mounting pit to allow the deck the rotate from a stored vertical position to an operative horizontal position and a source of power to rotate the deck. A sensor is mounted to the underside of the deck for delivering an output that ceases downward movement of said deck when a foreign object such as a human is sensed under said deck. The sensor comprises a wire mounted to span said deck at a position below it and a switch responsive to movement of said wire. The switch may be a mechanical, proximity or photoelectric type. The wire is fixed at one side of said deck and coupled to a pivoting member at the other side with the pivoting member normally positioned in proximity to said switch. A spring is employed to bias the pivoting member to a centered position relative to the switch in opposition to tension of the wire.

This invention will be described in greater detail by reference to the attached drawing and the description of the preferred embodiment that follows.

BRIEF DESCRIPTION OF THE DRAWINGS

FIG. 2 is a sectional view through the deck assembly;

FIG. 3a is an enlarged view of the switch mechanism;

FIG. 3b is a side view of the switch mechanism;

DESCRIPTION OF THE PREFERRED EMBODIMENT

Figure 1:
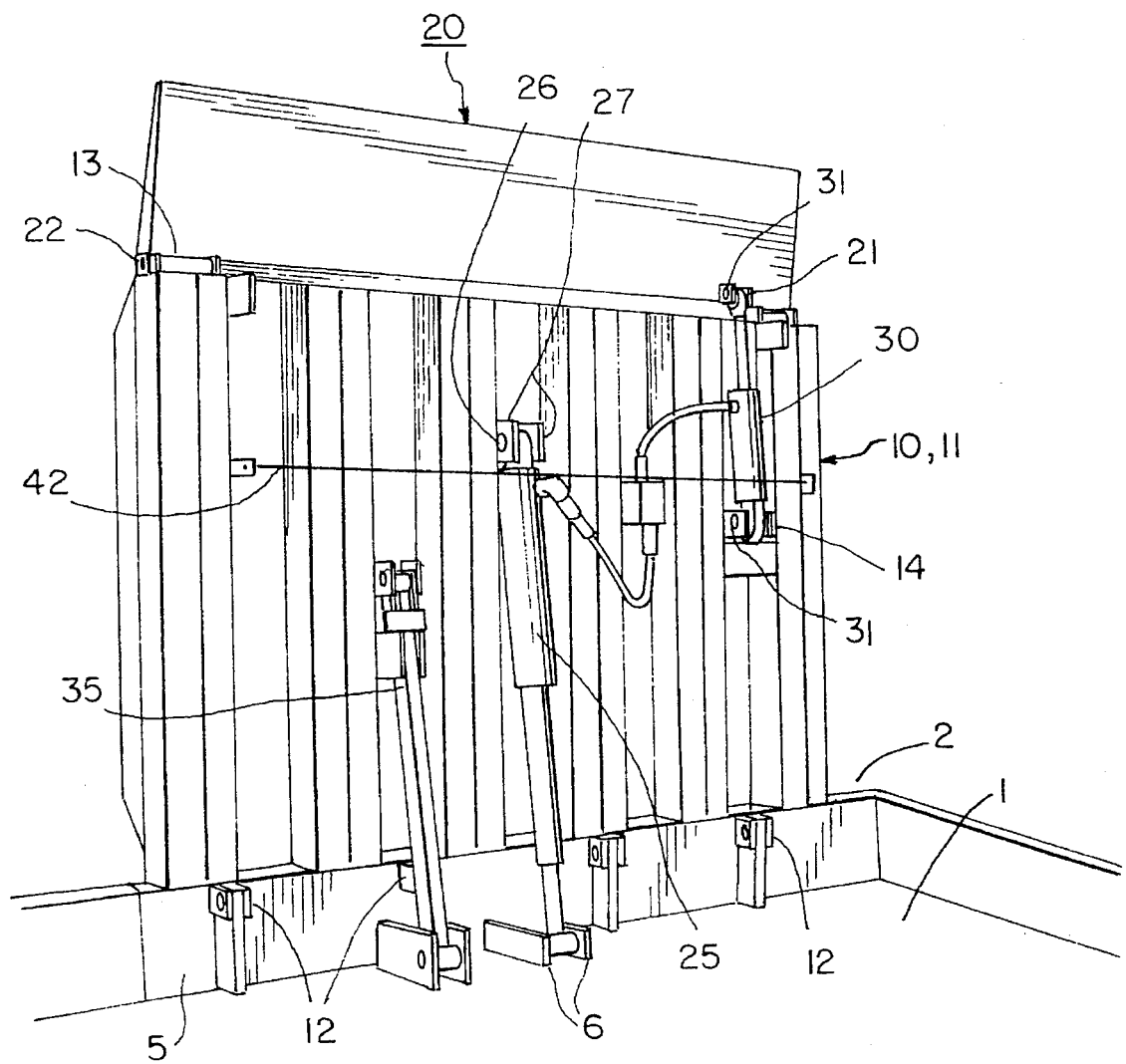
FIG. 1 is a front perspective view of a vertically storing dock leveler in the upright stored position.

Referring now to FIG. 1, a typical loading dock with a vertically storing dock leveler is illustrated. A shelf or pit 1 is recessed below the dock floor 2 in front of the dock leveler assembly 10. A deck assembly 11 pivots on hinges 12 which are mounted to a frame assembly 5 attached to the dock floor 2. A lip 20 pivots on a hinge pin 22 through hinge tubes 13 mounted to the front of the deck assembly 11. An hydraulic cylinder 25 is connected by pins 26 to brackets 27 on the deck assembly and brackets 6 on the frame assembly 5 to control the position of the leveler.

Similarly a lip cylinder 30 is connected by pins 31 to an arm 21 on the lip and a bracket 14 on the deck assembly to control the position of the lip 20. A mechanical lock assembly 35 provides a second structure to hold the deck assembly in the raised position. Typically the movement of the dock leveler is controlled by an electrically powered hydraulic pump, control valves and a control panel (not shown) located at a point remote to the pit. Electrical power is required to allow the dock leveler to be lowered, and the dock leveler will stop if electrical power to the control circuit is interrupted. In the type of leveler specifically applicable to this invention, a normally-closed hydraulic valve prevents hydraulic fluid from leaving the cylinder 25. Electrical power is required to open the valve and allow the deck assembly to lower. It will be understood however that this invention is applicable to vertically storing dock levelers in general, including those that may be manually moved up and down and those using different hydraulic arrangements.

The dock leveler with the safety device is shown pictorially in FIG. 1 and in a sectional view of the deck assembly in FIG. 2. A bracket 15 projects forward of the beam 16 near the edge of the deck assembly and brackets 18 are mounted on a beam 17 near the opposite side. A sensor bar 40 pivots on a pin 41 which passes through holes in the brackets 18. A trip wire or cord 42 has one end fastened to the bracket 15 and the other end to the sensor bar 40. A guide pin 19 is mounted to the beam 17 and carries a spring 43 which urges the sensor bar to rotate clockwise. The tension of the wire 42 opposes the spring force and causes the sensor bar 40 to remain in the position shown. In this position the sensor bar is centered with respect to the sensor 44. The sensor is a normally-open limit switch 4.4 mounted with nuts 45 to a bracket 46 attached to the deck assembly 11 and is activated by the opposite end of the sensor bar 40. A non-contacting proximity switch is shown for reliability, but a mechanical limit switch would perform a similar function.

Figure 4:
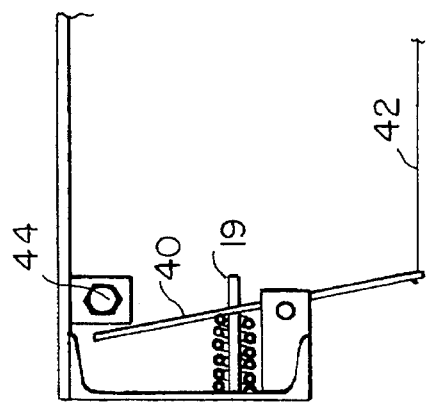
FIG. 4 is a side view of safety device in an activated state.

FIG. 4 illustrates the safety device when the trip wire has been pulled or deflected. The sensor bar has rotated counterclockwise and the opposite end no longer activates the limit switch. Electrical power to the control circuit is interrupted and the deck assembly is held stationary.

Figure 5:
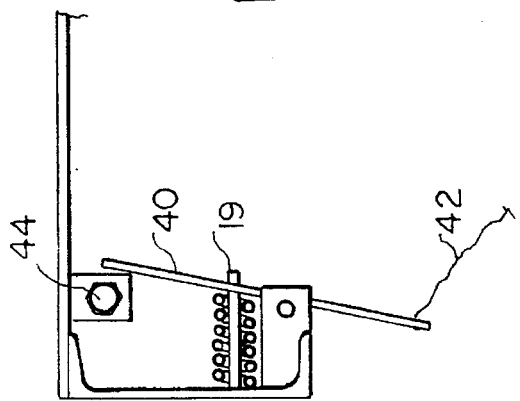
FIG. 5 is a side view of safety device disabled or mis-adjusted.

FIG. 5 illustrates the safety device when the trip wire has been broken or lost proper adjustment. The spring 43 causes the sensor bar 40 to rotate clockwise and the opposite end no longer activates the limit switch. Electrical power to the control circuit is interrupted and the deck assembly is held stationary.

This invention has several characteristics which ensure safe operation. The construction and operation are simple. The device can be easily inspected and adjusted given that the leveler stores vertically thereby exposing the safety device.

The leveler will not lower if the trip wire is broken or improperly adjusted. The trip wire does not require a straight line of action but can be threaded around irregular protrusions. The trip wire could even be threaded through the sensor bar 40 and led back to the other side by a second path to provide a greater area of coverage.

Figure 6:
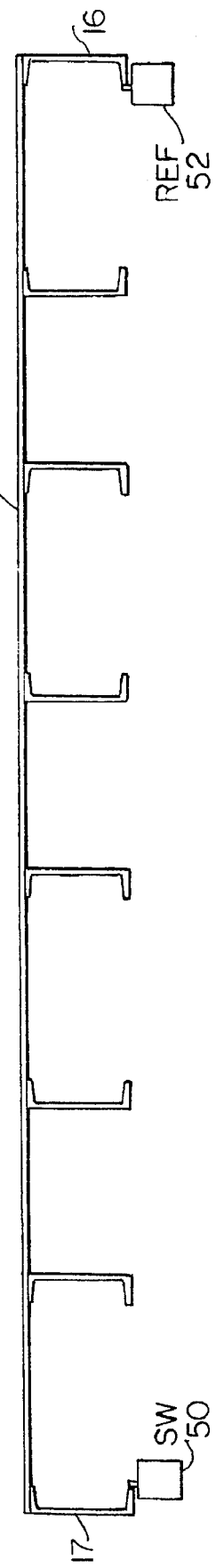
FIG. 6 is a sectional view of an alternative embodiment.

It is obvious that the function described can be performed by other mechanisms. The trip wire and lever mechanism could be replaced by a solid "panic bar" similar to that used on exit doors of public buildings used to trigger the sensor if it is displaced. The advantage of the trip wire is that it can be deflected in any direction, and can be threaded around irregular protrusions on the dock leveler. Similarly, the trip wire and lever mechanism could be replaced by a photo switch 50 and reflector 52, one mounted to each side of the leveler deck 11, as illustrated in FIG. 6. Again the advantage of the wire is that it can threaded around irregular protrusions on the dock leveler while the photoelectric device requires an uninterrupted field of view. Also, the sensitivity of a photo switch may be impaired by dirt on the optical surfaces. Lights, audible warnings and the like can be triggered by the sensor system to alert personnel that an emergency situation exists at one dock.

Having defined our invention, we claim:

1. A vertically storing dock leveler comprising; a deck, a pivot to allow deck to rotate from a stored vertical position to an operative horizontal position, a source of power to rotate said deck, and a sensor mounted to the underside of the deck delivering an output that ceases downward movement of said deck when a foreign object is sensed under said deck.

2. The vertically storing dock leveler of claim 1, wherein said sensor comprises a wire mounted to span the width of said deck at a position below it, said deck and a switch responsive to movement of said wire.

3. The vertically storing leveler of claim 2, wherein said wire is fixed at one side of said deck and coupled to a pivoting member at the other side, of said deck and said pivoting member positioned in proximity to said switch.

4. The vertically storing leveler of claim 3 further comprising a spring to bias said pivoting member to a centered position relative to said switch in opposition to tension of the wire.

5. The vertically storing leveler of claim 2, wherein said switch is a mechanically operated switch.

6. The vertically storing leveler of claim 2, wherein said switch is a proximity switch.

7. A vertically storing dock leveler comprising, a movable deck, a power source to move the deck up into a vertical stored position and to lower said deck into a generally horizontal operative position, and a sensor positioned under the deck and movable therewith to stop downward deck movement when said sensor is tripped.

8. The vertically storing dock leveler of claim 7, wherein said sensor is mounted to the underside of said deck.

9. The vertically storing dock leveler of claim 8, wherein said sensor comprises a rigid member spanning the underside of said deck and a switch responsive to movement of said rigid member.

10. The vertically storing dock leveler of claim 9 further comprising a spring to bias the rigid member into position with respect to said switch.

11. The vertically storing dock leveler of claim 8, wherein said sensor comprises a photo switch and reflector, one mounted to each side of the leveler where the switch is responsive to the interruption of a beam of light between the photo switch and the reflector.

\* \* \* \* \*